Oct. 15, 1935. N. O. PANZEGRAU ET AL 2,017,729

TRACK ADJUSTMENT FOR TRACK TYPE TRACTORS

Filed March 30, 1934 2 Sheets-Sheet 1

Inventors
Norman O. Panzegrau
and William C. Rosenthal
By V. F. Sprague
Atty.

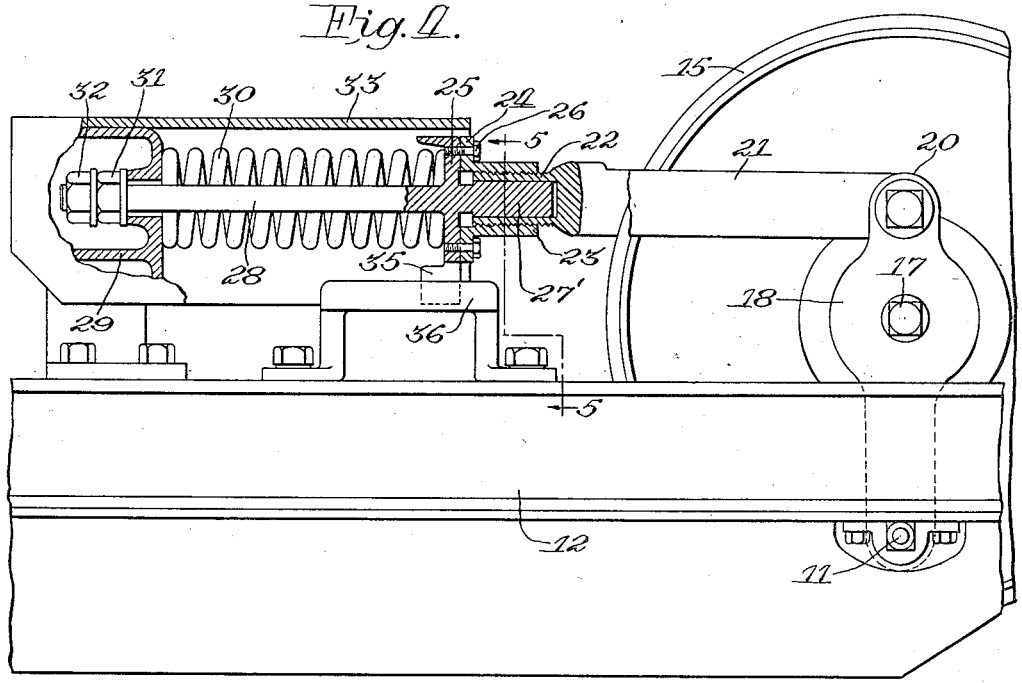
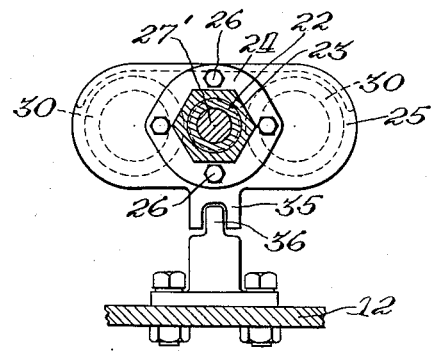

Patented Oct. 15, 1935

2,017,729

UNITED STATES PATENT OFFICE 2,017,729

TRACK ADJUSTMENT FOR TRACK TYPE TRACTORS

Norman O. Panzegrau and William C. Rosenthal, Chicago, Ill., assignors to International Harvester Company, a corporation of New Jersey Application March 30, 1934, Serial No. 718,140

9 Claims. (Cl. 74—242.15)

The invention relates to track type tractors. Such tractors comprise a pair of endless tracks, each of which envelopes and is driven by a drive sprocket wheel, the track also enveloping a roller truck frame and a front idler wheel carried by said truck frame. These tracks are adjustably set to a predetermined tightness and thus, when a stone or other obstruction enters the track mechanism, the track is caused to tighten too much, and sometimes to such an extent that breakage occurs. Accordingly, the front idler of each track unit is backed by a cushion, or recoil spring, which functions to permit temporary and automatically produced slack in the tracks, so that the obstruction will work itself out of the track and save it from damage. Such recoil springs must not tension the track bands, for a predetermined amount of slack is essential to easy running of the track. Thus, these recoil springs do not push on the idler wheels, but merely serve as a recoil backstop or cushion when brought into play to cause release of a track obstruction. These springs have to be strong enough to take the entire drawbar push when the tractor is moving in reverse gear and so the springs are fixed in several thousand pounds of compression. This spring compression is factory determined and provided when the tractor is originally assembled. It is of the utmost importance that such initially set spring compression be not altered. Yet, as the tractor is used, more than the desired amount of slack develops in the track bands because of friction and wear in the track joints. Such wear must be taken up without disturbing the fixed compression of the recoil springs.

More particularly then, the invention relates to the provision of such slack take-up mechanism.

The object of the invention is to provide an improved track adjustment, which will function without altering the set compression of the recoil spring with which it is associated.

A further object is to provide a simplified structure for accomplishing this result.

Other objects will be apparent to skilled workers in the art as the invention is more fully disclosed.

These objects are achieved by the example of the invention herein disclosed in which the truck roller frame of the tractor carries a movable idler wheel for carrying the front end of the endless belt, said wheel being backed by a cushion recoil spring assembly which is held in normal fixed compression. Extending forwardly from the head of the spring assembly is an adjustable structure which enables the yoke carrying the front idler to be let out to take up excessive belt slack. Means is provided to keep the head structure from being turned during such adjustment. When the adjustment has been effected, the adjustable structure is locked. All of this is achieved without changing the spring compression.

In the drawings:

Figure 4 is an enlarged side view of a modified form of recoil mechanism, parts thereof being shown in section; and, Figure 5 is a cross sectional view, as seen along the line 5—5 appearing in Figure 4, looking rearwardly.

Figure 1:
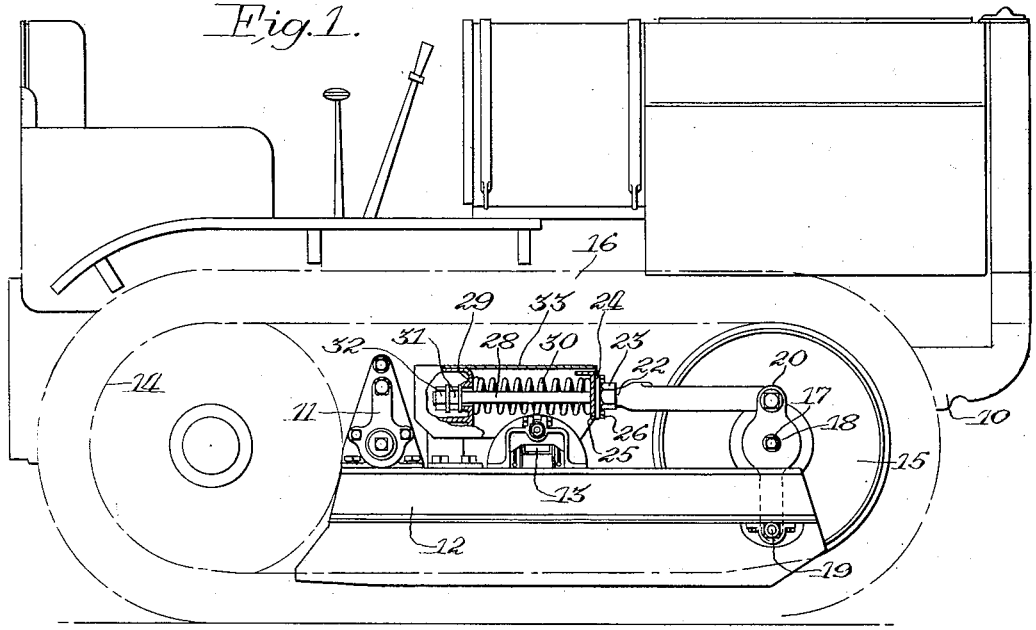
Figure 1 is a general side elevational view of a track type tractor showing the recoil spring assembly in section.

The tractor shown in Figure 1 is of a well known type having a body, or main frame 10 carrying at each side a bracket 11 for pivotally hanging the two roller truck frames 12, only one of which appears, as only one side of the tractor is shown. Thus, each truck 12 is pivotally connected at its rear end to the main frame, so that its front end may rise and fall in conformity with ground conditions traveled over, so as not to twist the main frame unduly. An equalizer 13 supports the forward portion of the body 10, said equalizer having its ends resting on the opposite trucks 12 in the well known manner. As both sides of the tractor are the same, only that side illustrated will be further described.

The rear end of the body 10 carries a driving sprocket wheel 14 while the forward end of the truck 12 carries a movable idler wheel 15. These two wheels 14 and 15 and the roller truck frame are enveloped in the usual manner by an endless track band or belt 16. The front idler wheel 15 is turnably carried by a pin 17 carried transversely across a pair of spaced, up-standing arms 18 pivotally connected at 19 at their lower ends to the forward portion of the truck frame 12. Each arm 18 is extended upwardly a short distance above the journal point 17, to provide a boss 20, to which bosses are pivotally connected the legs of a U-shaped yoke 21 that extends horizontally rearwardly over the truck frame and terminates in a rearwardly extended, hollow sleeve 22 having its exterior surface threaded.

Surrounding this threaded sleeve 22 is an adjusting nut 23 having its rear end merged into and formed as a circular flange 24 that abuts a head 25 to which the flange is secured by several bolts 26. This head 24 has formed with it a forwardly extending cylindrical extension 27, which slidably, but not rotatively, passes into the hollow sleeve 22. Further, the rear side of the head 25 has connected rigidly thereto a rearwardly extending rod 28, the rear end of which is loosely and slidably passed through a hole in a rear head member 29 formed as a bracket mounted in fixed position on the truck frame slightly in advance of the pivot bracket 11, as shown.

Between the front head 25 and rear head 29, a pair of coil springs 30 are arranged one on each side of the rod 28, as shown. The rear end of the rod 28 is threaded to carry an adjusting nut 31 and lock nut 32, both on the back side of the rear head 29. By means of these nuts 31, 32, the springs 30 are given an initial factory set in compression, and, once so set, it is intended by the manufacturer that the compression of the springs be not changed. A shield 33 is carried by the bracket 29 to enclose the spring assembly for the purpose of keeping out dirt and the like.

Figure 2:
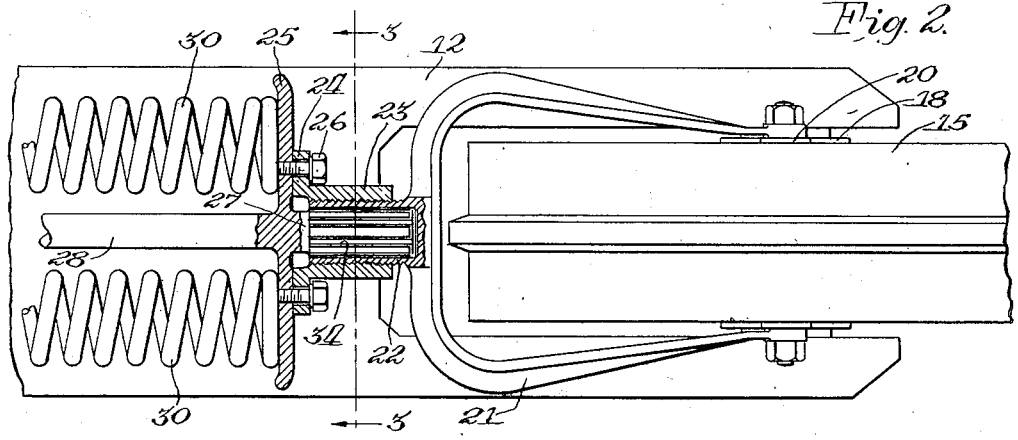
Figure 2 is a plan view, on an enlarged scale, showing the adjustment for the idler wheel in horizontal section.
Figure 3:
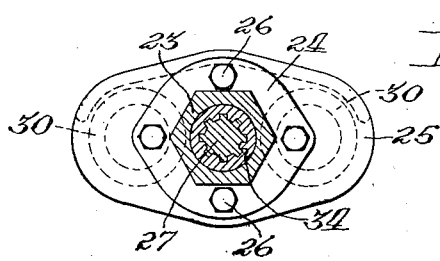
Figure 3 is a cross sectional view through this adjusting mechanism, as seen along the line 3—3 appearing in Figure 2, looking toward the rear.

In the form shown in Figures 1, 2 and 3, complementary grooves and splines 34 are formed between the surface of the extension 27 and the inner surface of the sleeve 22, such construction permitting sliding movement, but not rotative movement, between these parts when the nut 23 is adjusted. The part 27 thus will not turn.

In the form shown in Figures 4 and 5, such splined connection is eliminated and only a smooth sliding fit is provided between the extension here indicated as 27' and its telescopic fit in the sleeve 22. However, in this form, to prevent turning of the extension 27', a longitudinally grooved boss 35 is formed with and below the head 25, said grooved boss embracing a longitudinally disposed guide 36 mounted on the truck frame 12, as shown in Figures 4 and 5. Thus, when the flange 24 is free and the nut 23 is turned, the part 27' cannot rotate.

When the tractor is assembled originally, the springs 30 are given the desired compression by means of the adjusting nut 31. The nut 32 is merely a lock nut. The springs can normally exert no forward push on the idler wheel 15 because the nut 31 bears against the back side of the rear head bracket 29. Should an obstruction, such as a rock, get into the track, usually between the drive sprocket and rear end of the roller truck 12, then the track would tend to tighten unduly; such force then would be transmitted from the track to push the front idler wheel 15 rearwardly against the recoil springs 30, which would cushion the shock. Under such force the springs 30 would be compressed temporarily between the heads 25, 29 and the rod 28 would slide back freely through the hole in the rear head 29. This results in a slackening of the track belt and causes the obstruction to be automatically released from the track, whereupon the springs 30 instantly push the idler 15 forwardly to its normal position; the springs also returning to their initially compressed position when the nut 31 once more abuts the bracket 29.

After the track has been used a while, it develops objectionable slackness due to wear in the track joints. This must be taken up, if the track is to function properly. Accordingly, the idler wheel 15 must be let out, or moved forwardly, to restore the track to its proper tension. This is done by removing the bolts 26 to free the nut 23, which is then turned by a wrench in the proper direction. Such turning of the nut 23, in the form of Figures 1, 2 and 3, causes the sleeve 22 to be let out on the splined extension 27 without turning the extension 27 or the head 25 to which it is rigidly connected. The yoke 21 formed with the sleeve 22, of course, is also held against turning, so that the resultant movement is for the yoke to be slid forwardly to pivot the arms 18 and idler wheel 15 ahead. This takes slack out of the endless track in an obvious manner. During this operation, the flange 24 merely abuts the front face of the head 25. After the desired amount of slack has been taken up, the bolt holes are lined up in registration, so that the bolts 26 can once more be made to secure the nut 23 and its flange 24 to the head 25. The form of the invention shown in Figures 4 and 5 works in the same manner except that the telescopic arrangement of the extension 27' in the sleeve 22 is smooth and not splined. Instead, the head 25, rod 28, and extension 27' are kept from rotation during the adjusting operation by the groove 35 and cooperating guide member 36. In both forms of the invention, the idler wheel 15 can be let out to take up slack in the track without altering or in any way disturbing the fixed compression set of the cushion recoil springs 30.

From this disclosure it can now be seen that structure has been provided which achieves the desirable objects heretofore recited.

It is the intention to cover all such changes, for example as employing only a single spring 30, of the illustrative example herein described and shown as do not depart in material respects from the spirit and scope of the invention which is defined in the following claims.

What is claimed is:

1. In a track type tractor, a frame carrying a movable idler wheel, a spring cushion for the wheel comprising a head, a yoke connected to the wheel, adjusting means between the yoke and head to move the wheel without moving the head, said means comprising telescopically associated members between the head and yoke, one of the members being threaded and carrying a nut, means to detachably secure the nut to the head, and a splined connection between said telescopic members.

2. In a track type tractor, a frame carrying a movable idler wheel, a spring cushion for the wheel comprising a head, a yoke connected to the wheel, adjusting means between the yoke and head to move the wheel without moving the head, said means comprising telescopically associated members between the head and yoke, one of the members being threaded and carrying a nut, means to detachably secure the nut to the head, a guide on the frame, and means on the head engaging the guide.

3. In a track type tractor, a longitudinal frame carrying a movable idler wheel, a spring cushion for the wheel including a rod and a head carried by the rod adjacent one end thereof, said head having a rod extension forwardly thereof in the direction of the wheel, a yoke connected with the wheel and extending rearwardly and having at its rear end a sleeve telescopically associated with the said rod extension, a nut threadedly associated with the sleeve and having a flange abutting the head, means passed through the flange and head detachably to secure said flange and head together, said nut being operable when the head and flange are disconnected to move the sleeve and yoke to adjust the idler wheel away from the head without moving the latter, and means to prevent rotation of the head when the idler wheel is thus moved.

4. In a track type tractor, a frame carrying a movably mounted wheel, a head carried adjacent the frame, a cushion spring fixed in compression and abutting said head, means for adjustably fixing the head in position to alter the compression of the spring, an extension on the head directed toward the wheel, a yoke connected with the wheel having a sleeve at one end telescopically fitting around said extension, the outer surface of the sleeve being threaded and carrying a nut having a flange abutting the head, bolts detachably connecting the head and flange to prevent rotation of the nut, said bolts when removed permitting the nut to be turned to adjust the yoke to move the wheel, and means to hold the head stationary when the nut is turned.

5. In a track type tractor, a frame carrying a movably mounted wheel, a head carried adjacent the frame, a cushion spring fixed in compression and abutting said head, means for adjustably fixing the head in position to alter the compression of the spring, an extension on the head directed toward the wheel, a yoke connected with the wheel having a sleeve at one end telescopically fitting around said extension, the outer surface of the sleeve being threaded and carrying a nut having a flange abutting the head, bolts detachably connecting the head and flange to prevent rotation of the nut, said bolts when removed permitting the nut to be turned to adjust the yoke to move the wheel, and means to hold the head stationary when the nut is turned, said means comprising a splined connection between the extension and sleeve.

6. In a track type tractor, a frame carrying a movably mounted wheel, a head carried adjacent the frame, a cushion spring fixed in compression and abutting said head, means for adjustably fixing the head in position to alter the compression of the spring, an extension on the head directed toward the wheel, a yoke connected with the wheel having a sleeve at one end telescopically fitting around said extension, the outer surface of the sleeve being threaded and carrying a nut having a flange abutting the head, bolts detachably connecting the head and flange to prevent rotation of the nut, said bolts when removed permitting the nut to be turned to adjust the yoke to move the wheel, and means to hold the head stationary when the nut is turned, said means comprising a connection between the head and frame.

7. In a track type tractor, a frame carrying a movably mounted wheel, a head carried above the frame including a rod extending away from the wheel, a pair of coil springs set in compression on opposite sides of the rod and abutting the head, means to adjust the rod and head to alter the compression of the springs, an extension on the head directed toward the wheel, a yoke connected with the wheel having a sleeve at one end slidingly associated with the extension, the outer surface of said sleeve being threaded and carrying a nut having a flange adapted to flatly abut the head, bolts for detachably securing the flange and head to prevent rotation of the nut, said bolts when removed permitting the nut and flange to be turned to adjust the yoke to move the wheel, and means for positively holding the head, rod and extension against turning when the wheel is so moved.

8. In a track type tractor, a frame carrying a movably mounted wheel, a head carried above the frame including a rod extending away from the wheel, a pair of coil springs set in compression on opposite sides of the rod and abutting the head, means to adjust the rod and head to alter the compression of the springs, an extension on the head directed toward the wheel, a yoke connected with the wheel having a sleeve at one end slidingly associated with the extension, the outer surface of said sleeve being threaded and carrying a nut having a flange adapted to flatly abut the head, bolts for detachably securing the flange and head to prevent rotation of the nut, said bolts when removed permitting the nut and flange to be turned to adjust the yoke to move the wheel, and means for positively holding the head, rod and extension against turning when the wheel is so moved, said means comprising a splined connection between the extension and sleeve.

9. In a track type tractor, a frame carrying a movably mounted wheel, a head carried above the frame including a rod extending away from the wheel, a pair of coil springs set in compression on opposite sides of the rod and abutting the head, means to adjust the rod and head to alter the compression of the springs, an extension on the head directed toward the wheel, a yoke connected with the wheel having a sleeve at one end slidingly associated with the extension, the outer surface of said sleeve being threaded and carrying a nut having a flange adapted to flatly abut the head, bolts for detachably securing the flange and head to prevent rotation of the nut, said bolts when removed permitting the nut and flange to be turned to adjust the yoke to move the wheel, and means for positively holding the head, rod and extension against turning when the wheel is so moved, said means comprising a connection between the head and frame.

NORMAN O. PANZEGRAU.
WILLIAM C. ROSENTHAL.